United States Patent [19]

Cretney et al.

[11] 4,238,638
[45] Dec. 9, 1980

[54] ELECTRIC CABLE

[75] Inventors: Donald F. Cretney; John Howard, both of Vancouver, British Columbia, Canada

[73] Assignee: Phillips Cables Ltd., Ontario, Canada

[21] Appl. No.: 967,574

[22] Filed: Dec. 8, 1978

[51] Int. Cl.³ ............................................. H01B 7/28
[52] U.S. Cl. ............................. 174/23 C; 106/33; 252/72
[58] Field of Search .................. 174/23 C, 23 R, 116; 252/72; 106/33

[56] References Cited

U.S. PATENT DOCUMENTS

| | | | |
|---|---|---|---|
| 2,507,508 | 5/1950 | Elliott et al. | 174/23 C X |
| 3,538,235 | 6/1970 | Wappler et al. | 174/23 C |
| 3,803,339 | 4/1974 | Speekman | 174/23 C |
| 4,002,819 | 1/1977 | Woytiuk | 174/23 C |
| 4,004,077 | 1/1977 | Woytiuk | 174/23 C |

OTHER PUBLICATIONS

The Condensed Chemical Dictionary, Eighth Ed., Van Nostrand Reinhold, 1971, p. 459.

*Primary Examiner*—Arthur T. Grimley
*Attorney, Agent, or Firm*—Christie, Parker & Hale

[57] ABSTRACT

An electric cable having a core made of insulated conductors disposed within a polymeric sheath. Voids within the core, between the conductors, are at least partially filled in the unused cable with a mixture comprising untreated calcium carbonate and a water-attracting polymer able to form a gel on contact with water without swelling. The cables are made waterproof by the presence of the mixture, which is cheaper than prior mixtures but as effective.

5 Claims, 1 Drawing Figure

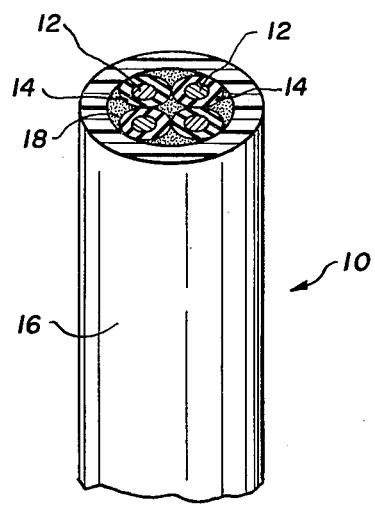

ELECTRIC CABLE

FIELD OF THE INVENTION

This invention relates to an electric cable having a core made up of insulated conductors disposed within a polymeric sheath and, more particularly, to a means of rendering such a cable water resistant.

DESCRIPTION OF THE PRIOR ART

In North America an electric cable typically comprises a core of insulated conductors having a wrap longitudinally applied and bound. The wrap is typically of polyester tape having a thickness in the range 0.003 inches to 0.006 inches and a sufficient width to provide approximately 0.25 to 0.5 inches overlap. Over the core wrap an aluminum shielding tape is applied longitudinally, again with overlap. This shielding tape is typically 0.008 inches thick aluminum having approximately 0.002 inches of thermoplastic material bonded to each surface. The above structure is incorporated within a sheath or jacket of low or medium density polyethene having a thickness of approximately 0.06 to 0.10 inches.

The above electric cable with a core comprising a plurality of conductors, has a substantial amount of free space or void between the conductors. This means that water leaking into the cable through defects in the sheath can pass along the cable freely. The effect is undesirable generally, particularly upon the conductive properties of the cable. The defects in the sheath of the cable can be caused by lightning, by errors in installing the cable, by rodents and by a number of other causes. The problem is acute in insulated telephone cables as once water has been admitted to such a cable the transmission performance is degraded substantially.

The problem of water ingress into cables has been known for sometime. A successful solution to the problem of preventing water ingress has been to fill the voids in the core with semi-solid water impervious materials, particularly petroleum jelly but also including other water-repelling, viscous substances. These cables are called "fully filled" and have been used in Canada for approximately 10 to 12 years.

Although the resistance to water penetration provided by fully filled cables is good there are disadvantages. In particular it can be difficult for cable technicians to splice the cable ends which, of course, are completely coated with the jelly. There is also a tendency for some jellies to migrate into polyethylene sheaths and insulation, thus necessitating careful selection programs to determine compatible materials.

Another approach known for some time but that has relatively recently stirred commercial interest is the use of so called "powder-filled" cables. For example, U.S. Pat. No. 2,507,508 issued in May 16th, 1950 to Elliot et al describes an electrical cable resistant to water flow with comminuted, water-swellable material lining the longitudinal voids. Examples of the materials in Elliot et al include polyvinyl alcohol, methyl cellulose, cellulose acetate and a variety of other organic compounds as well as some bentonite clays. In all cases the materials are water-swellable.

More recent developments include Woytiuk's U.S. Pat. Nos. 4,002,819, issued Jan. 11, 1977 and 4,004,077. The earlier patent shows the use of a mixture of calcium carbonate coated to be made water-repellent and at least one high molecular resin rapidly hydratable to form a viscous solution. The calcium carbonate is typically treated with a water-repellent, long chain fatty acid or modified fatty acid, for example lauric, myristic, palmitic, stearic or arachidic acid.

The later Woytiuk patent relates to the filling of the voids with a mixture of hydrophobic and hydrophilic powders and a coating of the conductors with a hydrophobic oil, for example a low viscosity paraffinic oil. The hydrophobic powder may be a long chain fatty acid-coated calcium carbonate. The hydrophilic powder may be a high molecular weight polyacrylamide. The percentage of the hydrophobic powder is stated to be between 92 and 70% of the total composition.

SUMMARY OF THE INVENTION

The present invention seeks to provide an electric cable having a core made of insulated conductors disposed within a polymeric sheath and rendered water proof by a powder composition cheaper than prior art compositions and yet at least as effective.

Accordingly, in a first aspect, the present invention is in an electrical cable having a core made of insulated conductors disposed within a polymeric sheath and is the improvement wherein voids within the core, between the conductors, are at least partially filled in the unused cable with a mixture comprising untreated calcium carbonate and a water-attracting polymer able to form a gel on contact with water without swelling.

In a preferred embodiment the water attracting polymer is hydroxyethyl cellulose although polyacrylamide has also proved useful.

In a particularly preferred embodiment the hydroxy ethyl cellulose is first subjected to an "activation" treatment. That treatment comprises keeping the compound at a temperature greater than 100° C. for at least three hours. The affect of this activation is greatly improved performance in the water attracting properties of the polymer. Any water within the polymer is driven off within one hour so the activation treatment is not merely dehydration. It is necessary to heat the material for an additional two hours, that is for a total of three hours, to acquire the activated effect. The activation is permanent and is not lost upon water regain.

DESCRIPTION OF THE PREFERRED EMBODIMENTS

An example of a cable according to the present invention is illustrated in the accompanying drawing. In that drawing a cable 10 comprises a core of insulated conductors 12 each disposed within an individual insulation jacket, usually of polyethylene, 14. The core is disposed within a polymeric sheath 16, again typically of polyethylene. The voids formed between the conductors 12 and the sheath 16 are, in accordance with this invention, filled with a mixture 18 comprising untreated calcium carbonate together with a water attracting polymer able to form a gel on contact with water without swelling.

Experimental work was carried out to compare the properties of electrical cables according to the present invention, particularly cables partially filled with hydroxyethyl cellulose or activated hydroxyethyl cellulose and calcium carbonate with cables filled with the same cellulose derivatives but with calcium carbonate having a water repellent coating.

The hydroxyethyl cellulose used was that available under the trade mark Cellosize QP15000. The coated calcium carbonate was available under the trade mark, Protex, and is calcium carbonate having a water-repellent coating of stearic acid. The tests were carried out on short lengths of hand made cables. The results below were obtained on five foot lengths with approximately 80% of the void filled. A three foot head of water was applied to one end of the cable.

| POWDER MIXTURE | OBSERVATION |
| --- | --- |
| Cellosize (10%)/Protex (90%) | Water penetrated 5' and dripped from end |
| Cellosize (20%)/Protex (80%) | Water penetrated 5' and dripped from end |
| Activated cellosize (10%)/Protex (90%) | Water dripped from end but stopped after 30 minutes |
| Cellosize (20%)/CaCO3 (80%) | Water penetrated 57" |
| Activated Cellosize (20%)/CaCO3 (80%) | Water penetrated 36" |
| Activated Cellosize (10%)/CaCO3 (90%) | Water penetrated 30" |

Further tests were carried out on a five foot length of hand made cable approximately 0.7 inches in diameter, four combinations of powder were examined with a core fill level of approximately 80%. It is probable that in commercial practice the amount of fill would be less. Five identical specimens of each powder combination were tested to increase the validity of the test results. The test procedure consisted of applying a three foot head of dyed water to one end of the five foot cable specimen and observing the progress of the water. One of two things occurred. First water rapidly penetrated the specimen and issued from the far end within fifteen minutes. Secondly, the water entered the specimen a short distance, stopped within fifteen minutes and no further penetration was noted over two to three hours.

In addition to the substances used in the previous tests polyacrylamide was used in these tests. Polyacrylamide is a water attracting polymer able to form a gel on contact with water without swelling.

All percentages are by weight.

| RESULTS | |
| --- | --- |
| TRIAL A | |
| 7% Polyacrylamide / 93% Coated CaCO3 | |
| SPECIMEN | OBSERVATIONS |
| 1 | Water penetrated 26" |
| 2 | Water penetrated 31" |
| 3 | Water penetrated 20" |
| 4 | Water penetrated 23" |
| 5 | Water penetrated 27" |
| TRIAL B | |
| 7% Polyacrylamide / 93% Neutral CaCO3 | |
| SPECIMEN | OBSERVATIONS |
| 1 | Water penetrated 12" |
| 2 | Water penetrated 12" |
| 3 | Water issued from far end |
| 4 | Water penetrated 12" |
| 5 | Water penetrated 12" |
| TRIAL C | |
| 10% Activated Hydroxyethyl Cellulose / 90% Coated CaCO3 | |
| SPECIMEN | OBSERVATIONS |
| 1 | Water penetrated 38" |
| 2 | Water issued from far end |
| 3 | Water penetrated 39" |
| 4 | Water issued from far end |
| 5 | Water issued from far end |
| TRIAL D | |
| 10% Activated Hydroxyethyl Cellulose / 90% Neutral CaCO3 | |
| SPECIMEN | OBSERVATIONS |
| 1 | Water penetrated 8" |
| 2 | Water penetrated 6" |
| 3 | Water penetrated 8" |
| 4 | Water penetrated 28" |
| 5 | Water issued from far end |

From the above, in comparing Trials A and B, by making allowances for the inevitable variability in hand made samples, the penetration into the powder containing untreated calcium carbonate was much less than the penetration using the coated calcium carbonate. The same conclustion can be drawn from a comparison of Trials C and D and it is clear that the results obtained with the preferred combination according to the present invention, that is the combination of heat activated hydroxyethyl cellulose and neutral calcium carbonate is preferred.

It should be noted that in addition to the listed, tested components, it may be desirable to incorporate a fungicide and perhaps flow modifying ingredients into the mixture used to fill the voids in the cables according to the present invention.

We claim:

1. In an electrical cable having a core made of insulated conductors disposed within a polymeric sheath wherein the improvement comprises at least partially filling the voids within the core, between the conductors, in the unused cable with a mixture comprising:
   untreated calcium carbonate; and
   a water-attracting polymer able to form a gel on contact with water without swelling comprising hydroxyethyl cellulose.

2. A cable as claimed in claim 1 in which the hydroxyethyl cellulose is first subjected to a treatment comprising keeping the compound at a temperature greater than 100° C. for at least three hours.

3. A cable as claimed in claim 2 in which the treatment comprises heating the hydroxyethyl cellulose at 105° C. for three hours.

4. In an electrical cable having a core made up of insulated conductors disposed within a polymeric sheath wherein the improvement comprises at least partially filling the voids in the core, between the conductors, with a mixture comprising untreated calcium carbonate and hydroxyethyl cellulose and in which the hydroxyethyl cellulose has first been subjected to heating at a temperature greater than 100° C. for a period of at least three hours.

5. A cable as claimed in claim 4 in which the treatment comprises heating the hydroxyethyl cellulose at 105° C. for three hours.

* * * * *